United States Patent [19]

Mehta

[11] 3,895,953

[45] July 22, 1975

[54] ADMIXTURES FOR REDUCING SLUMP LOSS IN HYDRAULIC CEMENT CONCRETES

[75] Inventor: Povindar K. Mehta, El Cerrito, Calif.

[73] Assignee: The Regents of the University of California, Berkeley, Calif.

[22] Filed: Jan. 11, 1974

[21] Appl. No.: 432,514

[52] U.S. Cl. .................... 106/88; 106/90; 106/97; 260/29.65
[51] Int. Cl. ............................................. C04l 7/03
[58] Field of Search .......... 106/90, 314; 260/29.65, 260/29.75, 88

[56] References Cited
UNITED STATES PATENTS

| | | | |
|---|---|---|---|
| 3,042,643 | 7/1962 | Foster | 106/90 |
| 3,240,736 | 3/1966 | Beckwith | 106/90 |
| 3,429,724 | 2/1969 | Keenum et al. | 106/90 |
| 3,433,657 | 3/1969 | Pickering | 106/90 |
| 3,487,038 | 12/1969 | Toy et al. | 106/90 |

*Primary Examiner*—J. Poer
*Attorney, Agent, or Firm*—Phillips, Moore, Weissenberger Lempio & Strabala

[57] ABSTRACT

In freshly mixed portland cement concrete, slump loss, which normally occurs during transportation and handling, can be either prevented or considerably reduced by admixing small amounts of styrene-butadiene latices, e.g., 0.01 to 0.15% of latex (on solid basis) by weight of concrete or 0.1 to 1.5% of latex by weight of cement. Thus, by maintaining plasticity of fresh (unhardened) concrete for prolonged periods of time, the small amount of latex admixture can permit transportation of pre-mixed concrete over longer hauling distances, or permit longer handling time for placement, consolidation, and finishing of concrete in formwork.

7 Claims, No Drawings

ADMIXTURES FOR REDUCING SLUMP LOSS IN HYDRAULIC CEMENT CONCRETES

BACKGROUND OF THE INVENTION

Portland cement concrete production in the United States amounts to about 500 million tons yearly. Out of this quantity, about 3/5th is made in ready-mix concrete plants and delivered to job sites by trucks. Among the subjects of most critical importance to the continued advancement of concrete technology, American Concrete Institute Committee 114, Research and Development, includes "reduction of early slump loss." The following statement by the Committee is quoted from the Journal of America Concrete Institute, Aug. 1972, page 499:

"Concrete is a useful construction material because it has the properties of remaining plastic long enough to be transported to the job site, and of then hardening into a strong, durable mass. Often, however, the degree of plasticity as measured by slump, or in the case of drier concrete by the Vebe apparatus, deteriorates during transport or waiting time to the point where satisfactory placing, consolidation, or finishing cannot be achieved. The usual solution on the job consists of adding water, thereby restoring the plasticity but reducing the strength and other desirable qualities of the hardened concrete.

Changes in concrete slump reflect changes in the cement paste component. During a short period after cement is mixed with water relatively rapid chemical reactions take place. This is followed by a period, which has been called the dormant period, which usually lasts 40 to 120 min. at room temperature. Behavior of concrete in the field during the plastic period depends on many variables including temperature of the materials; temperature, humidity, and circulation of the surrounding air; chemical composition of the cement clinker; $SO_3$ level of the cement; existence or absence of false setting tendency; admixtures used; and length and sequence of concrete mixing.

The adverse effects of slump loss can be counteracted through design of mixtures having an excess in slump at the start either through the use of additional cement or a water-reducing admixture, but it would be beneficial to eliminate or reduce the effect of the action responsible for the slump loss, per se."

The foregoing statement by the American Concrete Institute's Committee on Research and Development clearly shows the importance of slump loss in concrete technology, the need to understand the reasons for this phenomenon and, finally, to discover a solution.

In the above context, it is desirable to review briefly the process of hardening of fresh concrete. A concrete mixture, consisting of appropriate portions of cement, sand, gravel, and water, undergoes in sequence stiffening (loss of consistency), setting and hardening as a result of cement-water interaction. The phenomenon of setting and hardening of concrete is associated with the formation of hydration products of cement, and can be delayed by using set retarding admixtures. However, the phenomenon of early slump loss in concrete is not directly related to the setting and hardening reactions of cement, and hence cannot be remedied by using the retarding admixtures. Quoting again from the American Concrete Institutes' Committee on Research and Development, "The retarding admixtures currently in use generally have not been found useful in this respect; certain admixture-cement combinations even produce slump loss."

Methods of Test for Determining Slump of Portland Cement Concrete

A approximate measure of plasticity or consistency of concrete can be obtained by performing a, "slump test." The test consists of measuring the subsidence, in inches, of a pile of concrete formed in a mold which has the shape of a truncated cone of base diameter 8 in., top diameter 4 in., and height 12 in. The details of the standard procedure are covered by ASTM C 143 (1972 annual book of ASTM Standards, pages 96–97). The more plastic a concrete mixture is, the greater will be its subsidence or slump, and vice versa.

Slump loss during a certain time interval can be determined by measuring the initial slump of a concrete mixture after the ingredients have been intermixed for a few minutes to a homogeneous mass, permitting the fresh concrete mixture to stand undisturbed at the ambient temperature for a given time period at the end of which remixing it for a few minutes and measuring the final slump. The difference between the initial and the final slump readings gives the slump loss during that period.

The above procedure for determining slump loss ignores the effects of continuous mixing, and concrete temperature on slump. In fact, both these factors have a pronounced effect on slump loss, i.e., slump loss is greatly increased by prolonged mixing and/or temperature rise. In actual field practice, both these factors are usually operative. Premixed concrete is hauled to job site in slowly rotating concrete mixers which are mounted on trucks. The haulage time from the ready-mix plant to job site may be up to 45 minutes. Also, the ambient temperature may be considerably higher than the concrete mix temperature. Again, the size of concrete batch is generally large enough to raise its initial temperature by a few degrees on account of heat generated from cement hydration. All these considerations require modification of the slump loss determination procedure suitably. Frequently, small pan-type laboratory mixers when continuously mixing concrete for about half an hour at a temperature of 75°–85°F can satisfy field conditions that are most often encountered.

BRIEF DESCRIPTION OF THE INVENTION

It has now been determined that the addition of surprisingly small amounts of organic polymeric latices to concrete mixtures will appreciably reduce the early slump loss thereof. This reduction of early slump loss in ready-mixed concrete may considerably increase the time within which the ready-mixed composition may be transported to the job site and emplaced in position thereon. Furthermore, the addition of excess amounts of water is unnecessary when practicing this invention, and the problems such as loss of strength and durability, which are attendant to the addition of excess water are eliminated. Furthermore, the elimination of the reduction of early slump loss is ready-mixed concrete, by extending the amount of time within which the concrete mixtures may be handled, considerably increases the distance that is permissible for transporting the concrete mixture to the job. Thus, fewer ready-mix plants would be necessary to service a given construction area, or conversely, the same number of ready-mix plants as presently employed could service a much larger construction area.

It should be noted that it has been proposed in the prior art to add organic polymeric latices to concrete compositions. However, such proposed additions have been (1) in considerably greater portions than proposed in the present invention, and (2) have been advocated for the purposes of improving, not the properties of fresh or unhardened concrete, but of hardened concrete, such as increasing the "toughness" of hardened concrete, i.e., imparting better crack resistance to hardened concretes, or for the purpose of imparting improved adhesion or bonding in hardened concrete, or for enhancement of chemical durability. Some prior art patents advocating such usage are U.S. Pat. Nos. 1,940,528; 3,196,122; 3,228,907; and 3,250,736. Other prior art patents such as U.S. Pat. Nos. 2,576,955; 2,614,998; 2,819,239; and 2,648,645 have disclosed various compositions as water-reducers primarily for oilwell grouting applications. However, all such prior art compositions and/or methods are not adequate as per the ACI report quoted above for the purposes of elimination of slump loss, hence a new method is needed to overcome this problem in fresh concrete.

DETAILED DESCRIPTION OF THE DISCLOSURE

The early slump loss of fresh concrete may be eliminated or considerably reduced by the addition thereto of relatively small amounts, i.e., 1.5% or less by weight of cement of styrene-butadiene polymer-latex compositions. The styrene-butadiene latex is added along with the other concrete components during the mixing operation, and this addition effectively reduces the early slump loss of such concrete mixtures.

For the purposes of this invention, the term early slump loss means the difference between the initial slump and the final slump of freshly mixed concrete, when the concrete is kept undisturbed for 60 minutes at the laboratory temperature (70 ±3°F) except for 2 minutes of mixing operation just prior to the slump test or, alternatively, when the concrete mixture is made with warm water to bring it up to a temperature of 85°–90°F when the initial slump is determined, and mixed continuously in a laboratory pan-type mixer for a period of 25 minutes at the laboratory temperature (70±3°F) after which period the final slump is determined. The measurement of early slump loss in the examples cited in this invention was based on the latter procedure unless otherwise indicated.

It is known that on prolonged mixing, especially at temperatures above 60°F, all concretes made with hydraulic cements such as Portland cement, and modified Portland cements suffer slump loss. As used herein, the modified Portland cements are all hydraulic cements which have Portland cement compounds as main cementing constituents. Examples of such cements are Portland pozzolan cements, Portland slag cements, expansive cements, viz. Type K, Type M, and Type S cements. (For definitions of expansive hydraulic cements, refer to ACI Committee 223 Report, ACI Journal, August 1970, pages 584–585).

In actual field practice, concrete-making materials, such as cement, sand, gravel and water are mixed for a few minutes in high-speed mixers at concrete batching plants, then transported to the job sites in trucks having slowly revolving mixers. Depending upon the ready-mix plant location and haulage distance to the construction job, it usually takes twenty to forty minutes before the concrete mixture is removed from the truck-mixer. It is during this period that most cement concretes suffer some slump loss due probably to entrapment or imbibition of water by products of cement hydration. Processes which accelerate cement hydration also accelerate slump loss. Thus, longer mixing times and higher ambient temperatures generally result in greater slump loss during the stated period of time. For the same reason slump loss is influenced by cement composition. For instance Portland cements containing high $3CaO-Al_2O_3$, and certain modified Portland cements such as expansive cements also show higher slump loss due to larger quanties of a crystalline hydrate (ettringite) being formed during the early stages of cement hydration.

Apparently, the slump loss is associated with the formation of cement hydration products in the concrete composition. It is not definitely known why the addition of small amounts of styrene-butadiene latices reduces slump loss, but the reduction of such slump loss does occur. It is hypothesized that the styrene-butadiene molecules through some kind of surface action help water to maintain its lubricating action on the cement paste until setting and hardening reactions become dominant.

In any event, it has been determined that as little as 0.25% by weight of styrene-butadiene latex by weight of cement, or 0.03% latex by weight of concrete, is sufficient to effectively reduce the early slump loss of the above-noted types of hydraulic cements. Even amounts of as little as 0.1% latex by weight of cement produce significant reduction in slump loss.

Any type of commercially available styrene-butadiene latex is suitable for admixing into the concrete compositions. Thus, for instance, commercially available latices having a styrene-to-butadiene ratio of as high as 66 to 34 as well as other latices having a styrene-to-butadiene ratio of as low as 37 to 63 have been found to be effective for the purposes stated herein. Such latices are commercially available from a number of chemical manufacturers and are usually in the form of aqueous emulsions, wherein the styrene and butadiene polymers are dispersed in a water phase containing suitable emulsifying and emulsion-stabilizing agents.

A typical styrene-butadiene latex, stabilized with a nonionic surfactant has, about 48% solids by weight, a specific gravity of 1.01 (at 25°C), a pH of 10.5, and an average particle size of polymer of about 2000 angstrom units.

The latex may be added to the other ingredients of the concrete, i.e., cement, sand, gravel and water at any stage of the mixing process to secure the advantages of the invention. Latex in amounts of from about 0.1% solid polymer by weight of cement will produce a noticeable reduction in slump loss; on the other hand, it appears unnecessary to add more than about 1.5% solid polymer by weight of cement.

It should be understood that due to acceleration in cement hydration the setting time of concrete becomes shorter with increasing concrete temperatures. The percentages of latex stated above effectively reduce slump loss in concretes mixed at moderate, i.e., 70°–80°F, temperature ranges. The latices are found effective even at temperatures in the higher 85°–90°F range. However, at temperatures beyond 90°F (corresponding to hot summer weather concreting), it becomes necessary to include in the concrete mixture a set retarder in addition to a latex in order to effectively reduce the early slump loss.

Under hot temperature mixing conditions, the same amount of latex is effective in reducing slump loss if a set retarder is added either to the latex before addition to the concrete mixture or else directly to the concrete mixture. Effective set retarders are, for instance, citric acid, zinc oxide, diethylene glycol, and glycerine.

As little as 0.05% citric acid by weight of cement, or about 3% diethylene glycol or glycerol by weight of cement are found effective in restoring the ability of the styrene-butadiene latex to reduce early slump loss at elevated concrete temperatures (85°–90°F).

Unmodified commercial styrene-butadiene latices tend to produce concretes with considerable, viz. 5–15% air entrainment. Thus, for applications where air entrained concrete is desired, the use of small quantity of the latex admixture can serve the dual need of reducing early slump loss and yielding air entrained concrete. However, large volumes of entrained air are associated with significant loss in the compressive strength of the concrete. When such a strength loss is not permissible, an antifoaming agent, such as silicones or octyl alcohol, may be used to modify the latex composition. The antifoaming agent can also be added directly to the concrete during mixing. Such addition effectively reduces entrained air to acceptable levels. For instance, it was found during experimental work that the addition of unmodified styrene-butadiene latex in the amount of 0.25% by weight of cement gave 12% air entrainment at the end of a 30 minute mixing cycle. However, when this latex was modified by addition of 1 ml. of octyl alcohol per 100 ml. of latex emulsion, the air content of the same concrete was reduced to 2%, at which level there is no adverse effect on the strength and other properties of the hardened concrete.

The effect of styrene-butadiene latices on the early slump loss of a wide variety of Portland cement concretes was tested. Chemical compositions of the cements utilized in the tests and set forth in the tables below were as follows:

| | Portland Cement | | Portland - Expansive Cement | | | Portland - Blast Furnace Slag Cement | Portland - Pozzolan Cement |
|---|---|---|---|---|---|---|---|
| | ASTM Type I | ASTM Type II | Type K | Type M | Type S | | |
| $SiO_2$ | 20.3 | 23.4 | 20.5 | 18.3 | 19.3 | 23.5 | 21.9 |
| $Al_2O_3$ | 6.0 | 3.5 | 5.3 | 7.6 | 7.6 | 7.6 | 6.4 |
| $Fe_2O_3$ | 3.9 | 2.8 | 2.9 | 2.4 | 1.4 | 1.9 | 3.2 |
| CaO | 63.0 | 65.9 | 62.1 | 60.4 | 64.5 | 58.2 | 51.5 |
| MgO | 2.0 | 1.0 | 1.1 | 3.3 | 1.1 | 2.7 | 1.4 |
| $SO_3$ | 2.4 | 1.9 | 5.8 | 4.7 | 5.0 | 2.7 | 3.0 |
| Alkalis | 0.3 | 0.4 | 0.3 | 0.2 | 0.3 | 0.2 | 0.2 |
| Ignition Loss | 1.6 | 0.8 | 1.6 | 2.8 | 1.1 | 2.2 | 4.0 |
| Insoluble Residue | 0.4 | 0.1 | 0.3 | 0.5 | 0 | 0.7 | 8.4 |

The following tables present results of examples showing reduction of early slump loss in various concrete compositions, when a styrene-butadiene latex was used as admixture. Unless otherwise stated, the ratio of styrene to butadiene of the latex used in the tests was 66:34.

TABLE 1

Influence of Styrene-Butadiene Latex on Early Slump Loss of Type I Portland Cement Concrete

| Latex, % by Wt. of Cement | Temperature of Mixing Water °F | Initial Concrete (mixed 5 minutes) | | Final Concrete (mixed 30 minutes) | | Slump Loss (−) or Gain (+) in. |
|---|---|---|---|---|---|---|
| | | Temp., °F | Slump, in. | Temp., °F | Slump, in. | |
| 0 | 122 | 84 | 6 | 77 | 3½ | −2½ |
| 0.75 | 122 | 86 | 7½ | 78 | 8½ | +1 |
| 0.50 | 122 | 86 | 7½ | 77 | 8 | +½ |
| 0.50 | 75 | 75 | 8 | 78 | 8 | 0 |

TABLE 2

Influence of Styrene-Butadiene Latex on Early Slump Loss of Type II Portland Cement Concrete

| Latex, % by Wt. of Cement | Temperature of Mixing Water °F | Initial Concrete (mixed 5 minutes) | | Final Concrete (mixed 30 minutes) | | Slump Loss (−) in. |
|---|---|---|---|---|---|---|
| | | Temp., °F | Slump, in. | Temp., °F | Slump, in. | |
| 0 | 120 | 86 | 7 | 75 | 4¼ | −2¾ |
| 0.25 | 120 | 84 | 7 | 75 | 7 | 0 |
| 0.25 | 75 | 75 | 8 | 77 | 8 | 0 |
| 0.10 | 120 | 85 | 7 | 76 | 6 | −1 |
| 0.10 | 75 | 75 | 8 | 77 | 7 | −1 |

TABLE 3

Influence of Styrene-Butadiene Latex on Early Slump Loss of Type M Expansive Cement Concrete

| Latex, % by Wt. of Cement | Temperature of Mixing Water °F | Initial Concrete (mixed 5 minutes) Temp., °F | Initial Concrete (mixed 5 minutes) Slump, in. | Final Concrete (mixed 30 minutes) Temp., °F | Final Concrete (mixed 30 minutes) Slump, in. | Slump Loss (−) or Gain (+), in. |
|---|---|---|---|---|---|---|
| 0    | 122 | 84 | 5½ | 77 | 2½ | −3 |
| 0.75 | 122 | 84 | 7½ | 75 | 8½ | +1 |
| 0.50 | 75  | 75 | 8  | 77 | 8  | 0  |

TABLE 4

Influence of Styrene-Butadiene Latex on Early Slump Loss of Type S Expansive Cement Concrete

| Latex, % by Wt. of Cement | Temperature of Mixing Water °F | Initial Concrete (mixed 5 minutes) Temp., °F | Initial Concrete (mixed 5 minutes) Slump, in. | Final Concrete (mixed 30 minutes) Temp., °F | Final Concrete (mixed 30 minutes) Slump, in. | Slump Loss (−) or Gain (+), in. |
|---|---|---|---|---|---|---|
| 0    | 122 | 85 | 6  | 76 | 3  | −3  |
| 0.75 | 122 | 85 | 7¾ | 75 | 8½ | +¾  |
| 0.50 | 75  | 75 | 8  | 78 | 8  | 0   |

TABLE 5

Influence of Styrene-Butadiene Latex on Early Slump Loss of Type K Expansive Cement Concrete

| Latex, % by wt. of Cement | Temperature of Mixing Water | Initial Reading after 5 min. mixing Temp., °F | Initial Reading after 5 min. mixing Slump, in. | Final Reading after 30 min. mixing Temp., °F | Final Reading after 30 min. mixing Slump, zn. | Slump Loss/Gain, in. |
|---|---|---|---|---|---|---|
|      | 120 | 88 | 6  | 80 | 2¼ | −3¾ |
| 0.50 | 120 | 82 | 5¾ | 77 | 5¾ | 0   |
| 0.50 | 75  | 75 | 7¾ | 77 | 8  | +¼  |
| 0.25 | 120 | 87 | 6  | 77 | 6½ | +½  |
| 0.25 | 75  | 75 | 6½ | 72 | 6¾ | +¼  |

TABLE 6

Influence of Styrene-Butadiene Latex on Early Slump Loss of Portland-Blast Furnace Slag Cement Concrete

| Latex, % by wt. of Cement | Temperature of Mixing Water, °F | Initial Reading after 5 min. mixing Temp., °F | Initial Reading after 5 min. mixing Slump, in. | Final Reading after 30 min. mixing Temp., °F | Final Reading after 30 min. mixing Slump, in. | Slump Loss/Gain, in. |
|---|---|---|---|---|---|---|
| 0   | 120 | 79 | 6½ | 74 | 2¼ | −4¼ |
| 0.5 | 120 | 77 | 6¼ | 72 | 5¾ | −½  |

TABLE 7

Influence of Styrene-Butadiene Latex on Early Slump Loss of Portland-Pozzolan Cement Concrete

| Latex, % by wt. of Cement | Temperature of Mixing Water, °F | Initial Reading after 5 min. mixing Temp., °F | Initial Reading after 5 min. mixing Slump, in. | Final Reading after 30 min. mixing Temp., °F | Final Reading after 30 min. mixing Slump, in. | Slump Loss/Gain, in. |
|---|---|---|---|---|---|---|
| 0   | 120 | 78 | 5 | 73 | 2¼ | −2¾ |
| 0.5 | 120 | 78 | 6 | 72 | 6  | 0   |

Table 8 below illustrates results obtained on slump loss of a type K shrinkage-compensating cement concrete utilizing styrene-butadiene latices of two different styrene-butadiene ratios:

TABLE 8

Influence of Latex Type, i.e., Different Ratios of Styrene to Butadiene, on Early Slump Loss of Type K Expansive Cement Concrete (0.25% by wt. of Cement)

| Latex Type Styrene-Butadiene, Ratio | Temperature of Mixing Water | Properties of Fresh Concrete | | | | Slump Loss/ Gain, In. |
|---|---|---|---|---|---|---|
| | | Initial Reading after 5 min.mixing | | Final Reading after 30 min.mixing | | |
| | | Temp.,°F | Slump, in. | Temp.,°F | Slump,in. | |
| 66:34 | 120 | 87 | 6 | 77 | 6½ | + ½ |
| 37:63 | 120 | 87 | 6 | 77 | 5 | − 1 |
| 66:34 | 75 | 75 | 6½ | 72 | 6¾ | + ¼ |
| 37:63 | 75 | 75 | 6½ | 76 | 6 | − ½ |

The effectiveness of the styrene-butadiene latex in reducing slump loss over extended mixing times is set forth in table 9 below:

TABLE 9

Influence of Extended Mixing Time on Early Slump Loss of Type K Expansive Cement Concrete Containing Styrene-Butadiene Latex (0.25% by wt. of Cement)

| Initial Reading after 5 min. mixing | | First Reading after 30 min. mixing | | Second Reading after 45 min.mixing | | Slump,loss/gain after 45 min. mixing |
|---|---|---|---|---|---|---|
| Temp.,°F | Slump, in. | Temp., °F | Slump, in. | Temp.,°F | Slump, in. | |
| 87 | 6 | 77 | 6½ | 74 | 6 | 0 |
| 75 | 6½ | 72 | 6¾ | 72 | 6½ | 0 |

As described above, the styrene-butadiene latices are effective in reducing early slump loss under hot temperature mixing conditions when set retarders are also present in the cement concrete. Table 10 below illustrates the effectiveness of the latex-set retarder combination.

TABLE 10

Influence of Modified Styrene-Butadiene Latex (0.25%) on Slump Loss of a Type K Expansive Cement Concrete in the Temperature Range 85–96°F

| Latex Modified (set retarder) | Initial Reading (mixed 5 minutes) | | Final Reading (mixed 30 minutes) | | Slump Loss/gain, in |
|---|---|---|---|---|---|
| | Temp., °F | Slump., in. | Temp., °F | Slump, in. | |
| NIL | 95 | 6½ | 85 | 2 | − 4½ |
| Citric Acid | 95 | 6 | 90 | 4½ | − 1½ |
| Diethylene Glycol | 92 | 6 | 91 | 4½ | − 1½ |
| Glycerine | 96 | 6 | 91 | 4 | − 2 |

In all the above examples, Table 1–10, the concrete mixtures consisted of 5.2 lbs. of cement, 14.4 lbs. of Felton No. 2 sand (Fineness Modulus 2.8), 17.2 lbs. of ¾– ¼ inch Fairoaks gravel, and about 3.5 lbs. of water which was adjusted to get 6 – 8 inches initial slump of concrete.

What is claimed is:

1. A composition for reducing early slump loss in hydraulic cement concretes comprising a mixture of an hydraulic cement, sand, gravel, water and a styrene-butadiene latex present, on a solids basis, in an amount of from about 0.1 to about 1.5% by weight of the cement.

2. An hydraulic cement concrete mixture having reduced early slump loss including therein about 0.1 to about 1.5% by weight styrene-butadiene latex, on a solids basis, by weight of cement.

3. An hydraulic cement concrete mixture having reduced early slump loss at temperatures above 85°F including therein styrene-butadiene latex present, on a solids basis, in an amount from about 0.1 to about 1.5% by weight of the hydraulic cement, and a set retarder selected from the group consisting of citric acid and salts thereof, zinc oxide, ethylene glycol and glycerine.

4. A method for reducing early slump loss in hydraulic cement concretes comprising admixing styrene-butadiene latex in amounts of from about 0.1 to about 1.5% by weight of cement, into the concrete during the mixing thereof.

5. A method for reducing early slump loss in hydraulic cement concretes when mixed at temperatures greater than 85°F comprising admixing into the concrete styrene-butadiene latex in amounts of from about 0.1 to about 1.5% by weight of the hydraulic cement in said concrete, and further admixing into the concrete (in combination with) a set retarder.

6. The method of claim 5, wherein the set retarder is selected from the group consisting of citric acid and salts thereof, zinc oxide, ethylene glycol and glycerine.

7. A method of obtaining air entrained concrete having reduced slump loss tendencies, comprising admixing styrene-butadiene latex in amounts of from about 0.1 to about 1.5% by weight relative to cement in said concrete, with concrete components of cement, sand, gravel and water during the mixing thereof.

* * * * *

UNITED STATES PATENT OFFICE
CERTIFICATE OF CORRECTION

Patent No. 3,895,953  Dated July 22, 1975

Inventor(s) Povindar K. Mehta

It is certified that error appears in the above-identified patent and that said Letters Patent are hereby corrected as shown below:

TABLE 5, should appear as shown on the attached sheet.

Signed and Sealed this ninth Day of December 1975

[SEAL]

Attest:

RUTH C. MASON  
Attesting Officer

C. MARSHALL DANN  
Commissioner of Patents and Trademarks

Patent No. 3,895,953                                      Dated July 22, 1975

Inventor(s)  Povindar K. Mehta

TABLE 5

Influence of Styrene-Butadiene Latex on Early Slump Loss of Type K Expansive Cement Concrete

| Latex, % by wt. of Cement | Temperature of Mixing Water | Properties of Fresh Concrete | | | | Slump Loss: Gain, in. |
|---|---|---|---|---|---|---|
| | | Initial Reading after 5 min. mixing | | Final Reading after 30 min. mixing | | |
| | | Temp., °F | Slump, in. | Temp., °F | Slump, in. | |
| 0 | 120 | 88 | 6 | 80 | 2 1/4 | − 3 3/4 |
| 0.50 | 120 | 86 | 5 3/4 | 77 | 5 3/4 | 0 |
| 0.50 | 75 | 75 | 7 3/4 | 77 | 8 | + 1/4 |
| 0.25 | 120 | 87 | 6 | 77 | 6 1/2 | + 1/2 |
| 0.25 | 75 | 75 | 6 1/2 | 72 | 6 3/4 | + 1/4 |